United States Patent
Smith et al.

(10) Patent No.: US 8,097,061 B2
(45) Date of Patent: Jan. 17, 2012

(54) ELLIPTICAL SEAL INTERFACE FOR FILTER ASSEMBLY

(75) Inventors: Bradley Smith, Madison, WI (US);
Kwok-Lam Ng, Madison, WI (US);
Benjamin L. Scheckel, Stoughton, WI (US); Merwyn Coutinho, Madison, WI (US); Peter K. Herman, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 616 days.

(21) Appl. No.: 12/233,115

(22) Filed: Sep. 18, 2008

(65) Prior Publication Data

US 2010/0064646 A1    Mar. 18, 2010

(51) Int. Cl.
*B01D 39/00* (2006.01)
(52) U.S. Cl. .......... 55/501; 210/130; 210/136; 210/232; 210/445; 210/470
(58) Field of Classification Search ............ 55/501; 210/130, 136, 232–234, 443, 445, 447, 450, 210/456, 470
See application file for complete search history.

(56) References Cited

U.S. PATENT DOCUMENTS

| 6,884,349 B1 | 4/2005 | Jiang |
| 2005/0252848 A1 | 11/2005 | Miller |
| 2006/0122670 A1* | 6/2006 | Grahn et al. ............ 607/96 |

OTHER PUBLICATIONS

International Search Report in corresponding International Application No. PCT/US2009/049927 mailed Feb. 25, 2010, 3 pages.
Written Opinion of the International Searching Authority in corresponding International Application No. PCT/US2009/049927 mailed Feb. 25, 2010, 4 pages.

* cited by examiner

*Primary Examiner* — Jason M Greene
*Assistant Examiner* — Karla Hawkins
(74) *Attorney, Agent, or Firm* — Hamre, Schumann, Mueller & Larson, P.C.

(57) ABSTRACT

A filter assembly is described that includes a unique seal configuration between a filter and a housing. The filter has a filter media that allows fluid to be filtered therethrough, and has an endplate with an opening that allows fluid to flow into or out of the filter media. The endplate has a main surface with an elliptical spud protruding outward from the main surface and surrounding the opening. An oval seal is disposed about an outer surface of the elliptical spud. The housing is releasably connected to the filter, and has a mounting component. The mounting component has an elliptical boss that mates with the elliptical spud and seals against the oval seal.

19 Claims, 5 Drawing Sheets

US 8,097,061 B2

ELLIPTICAL SEAL INTERFACE FOR FILTER ASSEMBLY

FIELD

The present disclosure relates generally to filters and filter assemblies. More particularly, the present disclosure relates to an improved sealing configuration of a filter assembly, namely between a filter and a housing.

BACKGROUND

Fluid filters are widely known and widely used in various systems and applications, for example such systems that require particle and/or fluid separation from a working fluid. As one example, closed crankcase ventilation systems are well known and employ oil filtration capabilities to separate condensates, such as oil and/or water droplets, mist, and aerosol from gases, so that the gases can be routed back to the air intake or turbo system. Proper sealing in such systems is important to maintain system efficiency in order to meet emission regulations and provide suitable protection to an engine. That is, proper sealing is needed to maintain separation between "dirty" and "clean" sides of a filter used in such systems.

Further improvements can be made despite existing designs.

SUMMARY

The present disclosure generally relates to a filter assembly that includes a unique sealing configuration between a filter and a housing. The seal interface described herein can provide a keying feature which can be helpful to insure that the correct filter is being installed and can help make installation easier. Generally, the seal interface is between one end of a filter and one end of a mating component or head of a housing. The filter includes an elliptical shaped protrusion with a gasket around its outer perimeter. For the mating component, a housing has a portion with an elliptical shaped boss to seal against the elliptical shaped protrusion.

In one embodiment, a filter assembly includes a filter and a housing. The filter has a filter media that allows fluid to be filtered therethrough, and has an endplate with an opening that allows fluid to flow into or out of the filter media. The endplate has a main surface with an elliptical spud protruding outward from the main surface and surrounding the opening. An oval seal is disposed about an outer surface of the elliptical spud. The housing is releasably connected to the filter, and has a mounting component. The mounting component has a housing opening that fluidly communicates with the opening of the endplate, and an elliptical boss surrounding the housing opening. The elliptical boss mates with the elliptical spud and seals against the oval seal.

In one embodiment, the oval seal includes at least one peak, such that a portion of the oval seal extends away from the main surface of the endplate with the opening. With the peak configuration, the oval seal can be constructed as an outline of a hyperbolic paraboloid or outline of a "saddle" surface.

In yet another embodiment, the elliptical spud includes at least one side opening extending through a wall thereof, and the oval seal includes at least one anchor portion formed through the side opening. The anchor portion retains the oval seal around the elliptical spud.

BRIEF DESCRIPTION OF THE DRAWINGS

FIG. 3 is a partial sectional view of the filter of FIG. 1 and showing an end of a housing that the filter is mounted on.
FIG. 8 is a partial sectional view of the filter of FIG. 7 and showing a housing that the filter is mounted on.

DETAILED DESCRIPTION

Figure 1:
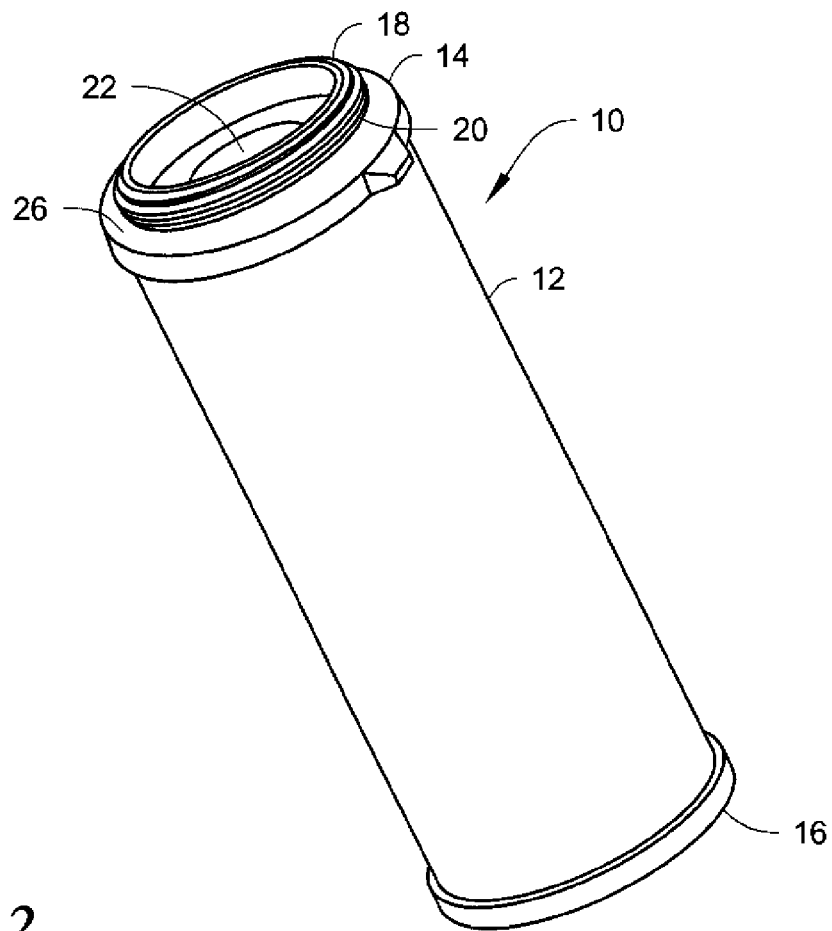
FIG. 1 is a perspective view of an embodiment of a filter.

The present disclosure generally relates to a filter assembly that includes a unique sealing configuration between a filter and a housing. A seal interface is provided between one end of a filter and one end of a mating head or component of a housing. The filter has an elliptical shaped protrusion with a gasket around its outer perimeter. For the mating component, a housing has a portion with an elliptical shaped boss to seal against the elliptical shaped protrusion of the filter. The seal interface described herein can provide a keying feature which can be helpful to insure that the correct filter is being installed and can help make installation easier.

For illustration purposes only, the inventive concepts for a filter design are described with respect to a coalescer filter, which often have been used in known closed crankcase ventilation systems in oil filtration, where sealing between the "dirty" and "clean" sides are critical to the overall efficiency of emissions control devices. It will be appreciated, however, that the disclosure is not meant to be limiting to coalescer filters or even filters for CCV filtration systems, and that the inventive concepts described herein, including the sealing interface, can be used in and adapted for other filter assemblies. It will be further appreciated that various working fluids in need of filtration, including but not limited to oil, can benefit from the inventive concepts disclosed herein.

FIGS. 1-4 show a filter assembly that can be employed as a coalescer filter in CCV filtration systems. In general, CCV filtrations systems, including coalescer filters are well known. FIGS. 1-4 show an improved sealing interface or configuration that can be used for a filter assembly in such systems. The filter assembly includes a filter 10 (see FIGS. 1 and 2) and a housing 30 that the filter 10 is mounted to (see FIGS. 3 and 4).

The filter 10 has a filter media 12 attached to two endplates 14, 16. In one example, the filter media 12 is arranged and configured as a cylindrical filter element, where the endplates 14, 16 are connected at ends of the cylinder. One of the endplates (e.g. endplate 14) includes an opening 22 that allows fluid to flow into or out of the filter media 12. The filter media 12 has a wall or side structure that allows fluid to be filtered through the filter media 12.

The filter media 12 may be constructed of a variety of materials for filtering a working fluid and the particular material may be selected as desired and/or necessary and as may be known by one of skill in the art. It will be appreciated that the particular material for the filter media is not meant to be limiting and can be dependent on the type of working fluid being subject to filtration and dependent upon the desired material to be removed or filtered from the working fluid.

The endplate 14 with the opening 22 has a main surface 26 with an elliptical spud 18 protruding outward from the main surface 26. The elliptical spud 18 surrounds the opening 22. An oval seal 20 is disposed about an outer surface of the elliptical spud 18. For example, the oval seal is partially disposed in a groove of the elliptical spud 18 (see FIG. 3). The seal 20 is a gasket that is oval shaped, since the elliptical spud 18 is oval. In one embodiment, the oval seal 20 is overmolded onto the elliptical spud 18. In other embodiments, the oval seal 20 is a slip-on gasket that may be attached to the elliptical spud 18 through an interference fit between the oval seal 20 and elliptical spud 18. As shown, a wiper gasket (or ribbed seal) is employed, which can provide for a low insertion force while maintaining a robust joint. It will be appreciated that one or more ribs or wiper structures may be employed as desired and/or necessary. The oval seal 20 can be constructed of a variety of known materials, for example, silicone or another resilient, somewhat flexible material that can create a seal. It will be appreciated that the material selected for the oval seal 20 is not meant to be limiting and any material may be used that is equally or more suitable and that may be used by one of skill in the art.

The housing 30 is releasably connected to the filter 10. As one example, the filter 10 is inserted in an axial direction to mount onto the housing 30. The housing 30 has a mounting component that includes an elliptical boss 32 that surrounds a housing opening 34. When the filter 10 is connected to the housing 30, the housing opening 34 is in fluid communication with the opening 22 of the one endplate 14 of the filter 10. The elliptical boss 32 mates with the elliptical spud 18 and seals against the oval seal 20. In use, for example, the filter 10 is connected to the housing 30 when the elliptical spud 18 is inserted into the elliptical boss 32, such that the elliptical boss 32 surrounds the elliptical spud 18 and oval seal 20.

As shown, the elliptical boss 32 of the housing 30 in some embodiments can have a shoulder 36 that abuts the main surface 26 of the endplate 14.

Figure 3:
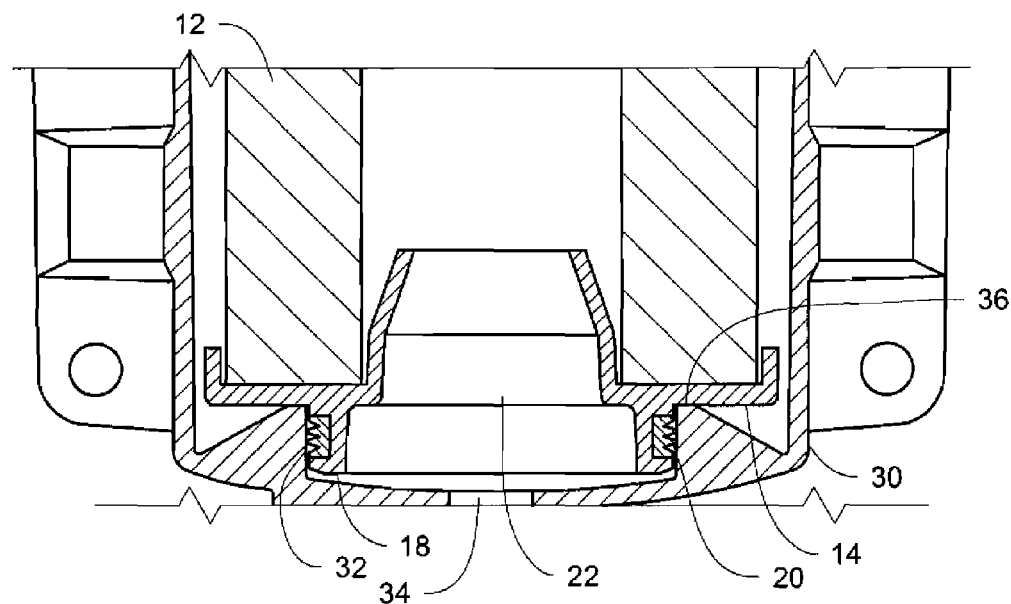
Figure 4:
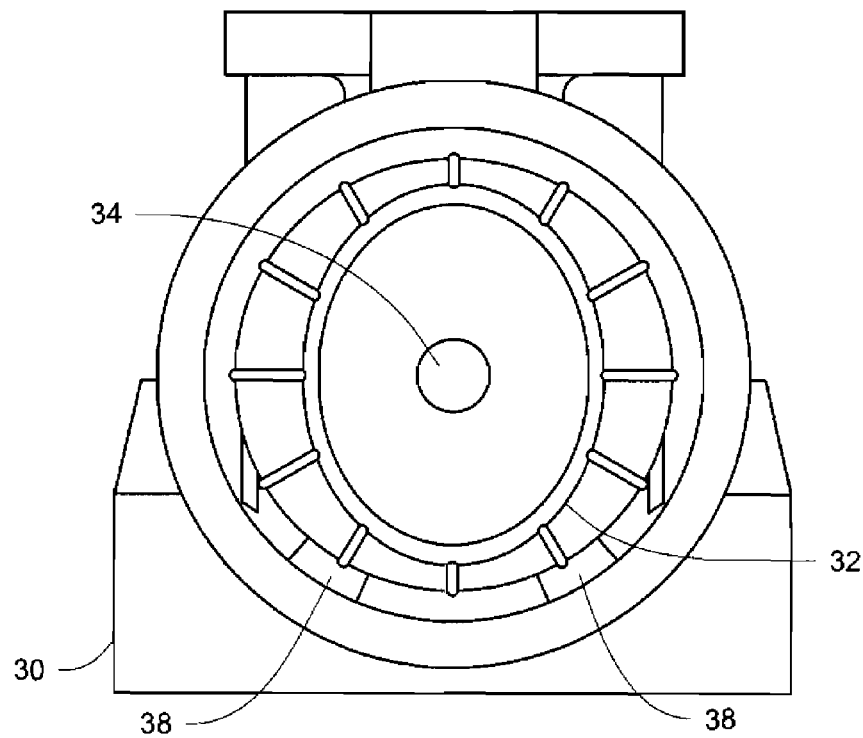
FIG. 4 is an end view of the housing shown in FIG. 3 from the side which the filter is inserted.

While the housing 30 is not completely shown, however, it will be appreciated that the housing 30 encloses the filter 10. FIGS. 3 and 4 show a top half of a housing for a closed crankcase ventilation system (i.e. crankcase "breather"), where the improved seal interface is formed as part of the housing 30 (e.g. elliptical boss mates with elliptical spud and oval seal). It will be appreciated that a bottom half of such housings are well known and need not be further described. That is, other than the improved mating interface, such housings are well known by one of skill in the art and need not be further described.

The sealing/gasket design described above in FIGS. 1-4 can provide a seal interface between the filter element and the mating head (e.g. housing). One function of the interface is to provide sealing between the "dirty" and "clean" sides of the filter element. As shown, the elliptical shaped spud protrudes from the filter element along the insertion axis. The elliptical spud is inserted into a similar shaped elliptical boss in the mating head. The elliptical boss is dimensioned specifically to ensure sealing capability with the oval seal on the elliptical spud.

Figure 2:
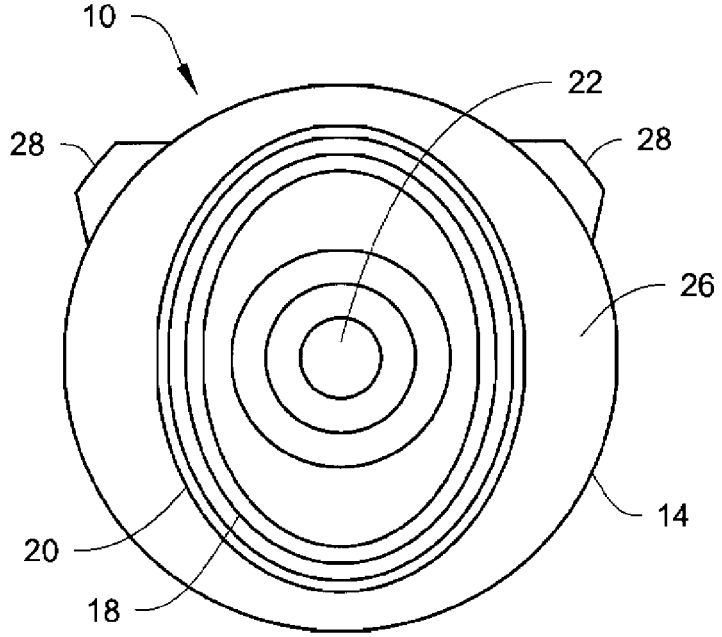
FIG. 2 is an end view of the filter of FIG. 1.

The particular oval seal configuration, including the elliptical spud and elliptical boss, can provide a keying feature to ensure that the correct filter is being installed. In addition to the oval seal configuration, FIGS. 1, 2, and 4 show another keying feature where tabs 28 of the endplate 14 (see FIGS. 1 and 2) fit into slots 38 of the housing 30 (see FIG. 4). Such a tab and slot configuration can help orient and "key" the filter 10 within the housing 30 to further help insure that the correct filter is being installed.

Figure 5:
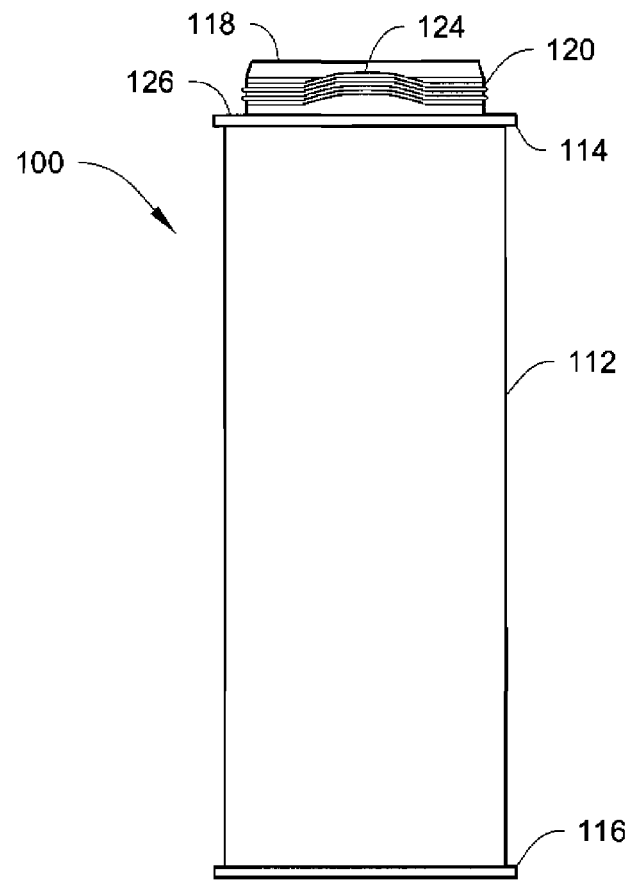
FIG. 5 is a side view of another embodiment of a filter.
Figure 6:
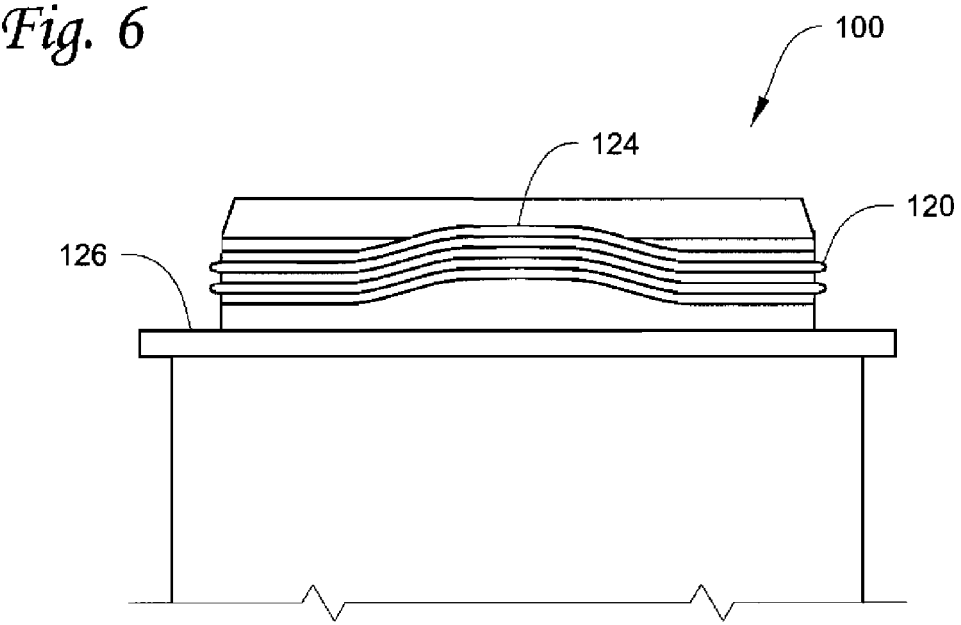
FIG. 6 is a close up partial side view of the filter of FIG. 5.

Turning to FIGS. 5 and 6, another embodiment of an oval seal 120 is illustrated in side view for a filter 100. As with filter 10, the filter 100 includes a filter media 112 attached to two endplates 114, 116. The filter media 112 is arranged and configured as a cylindrical filter element, where the endplates 114, 116 are connected at ends of the cylinder. One of the endplates (e.g. endplate 114) includes an opening which can be the same as shown in FIGS. 1 and 2, and also includes an elliptical spud 118. The oval seal 120 is disposed about an outer surface of the elliptical spud 118 similarly as oval seal 20. The oval seal 120 is a gasket that is oval shaped, since the elliptical spud 118 is oval. It will be appreciated that the material for the oval seal 120 can be the same as the material used for oval seal 20 and can include the ribbed/wiper structure. As with filter 10, the endplate 114 of the filter 100 can include a tab structure (e.g. tab 28 shown), which can fit into a similar slot configuration of a housing (e.g. slot 38 of housing 30).

Differently from oval seal 20, the oval seal 120 includes at least one peak 124 in its configuration. As shown, a peak 124 of the oval seal 120 is a raised portion that extends axially away from the main surface 126 of the endplate 114 and toward the end of the elliptical spud 118. The seal/gasket configuration (e.g. peak structure) in FIGS. 5 and 6 can be used in addition to the wiper seal structure or as an alternative to the particular structure of oval seal 20. It will be appreciated that one or even multiple peaks along the sealing perimeter can be employed. The peak structure can allow for an even lower insertion force during the initial engagement between the filter 100 and a receptive housing (e.g. housing 30).

In some embodiments, the peak structure is configured and arranged with projecting tangent arcs in a wave pattern around the surface of the elliptical spud. Such a shape of the oval seal can create a continuous curvature. In three-dimension, for example, the oval seal can be constructed to generally resemble an outline of a hyperbolic paraboloid or outline of a "saddle" surface (e.g. when two peaks are included as part of the oval seal). What is meant by hyperbolic paraboloid is the generally known mathematical function where quadric surfaces continuously open up along the x-axis and continuously opens down along the y-axis.

Figure 9:
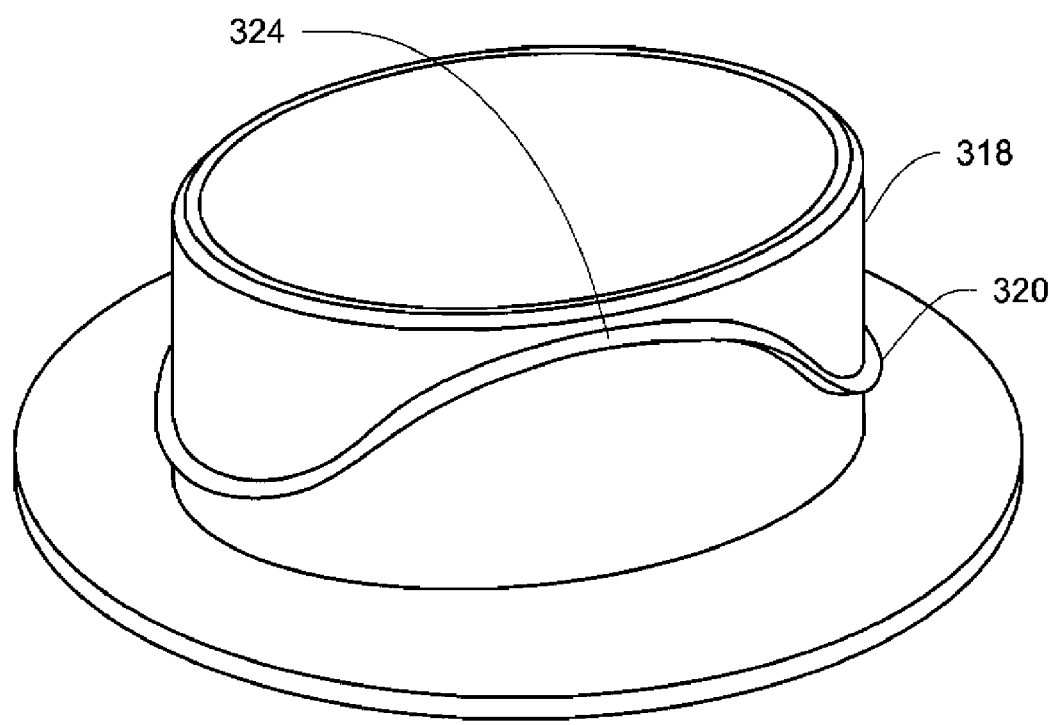
FIG. 9 is a perspective view of another filter showing a slight variation of a seal configuration from that shown in FIGS. 5 and 6.

FIG. 9 shows a perspective view of an oval seal 320 having an example of such a continuous curve or wave configuration. As shown in FIG. 9, the oval seal 320 is disposed around the elliptical spud 318. The oval seal 320 is oval due to the shape of the elliptical spud 318, but also generally resembles an outline of a hyperbolic paraboloid or "saddle" having two peaks 324. One peak 324 is shown, but it will be appreciated that another peak 324 is oppositely disposed from the peak 324 shown. The shape of the oval seal 320 is such that it opens up (see left and right sides of the lower portions of the oval seal 320) and opens down (see peak 324). Generally, an outline of a hyperbolic paraboloid and/or the specific shape as shown in FIG. 9 may be employed to provide a gradual increase in insertion force as opposed to an abrupt increase caused by flat sections.

As described, such a configuration and shape for the oval seal can further provide an easy insertion gasket shape since the portion of gasket engagement against insertion depth would be a continuous and smoothly varying function. That is, the continuous and smoothly varying shape of the oval seal shown in FIG. 9 can help make installment and servicing of a filter easier. While the tab and slot structure may not be shown in all the Figures (e.g. FIGS. 5, 6, and 8) and while the multiple ribbed or wiper structure may not be shown in all the drawings (e.g. FIG. 8), it will be appreciated that any of the endplate/housing structures and seal configurations can respectively include the tab/slot structure and/or the ribbed or wiper structure as desired and/or necessary.

Figure 7:
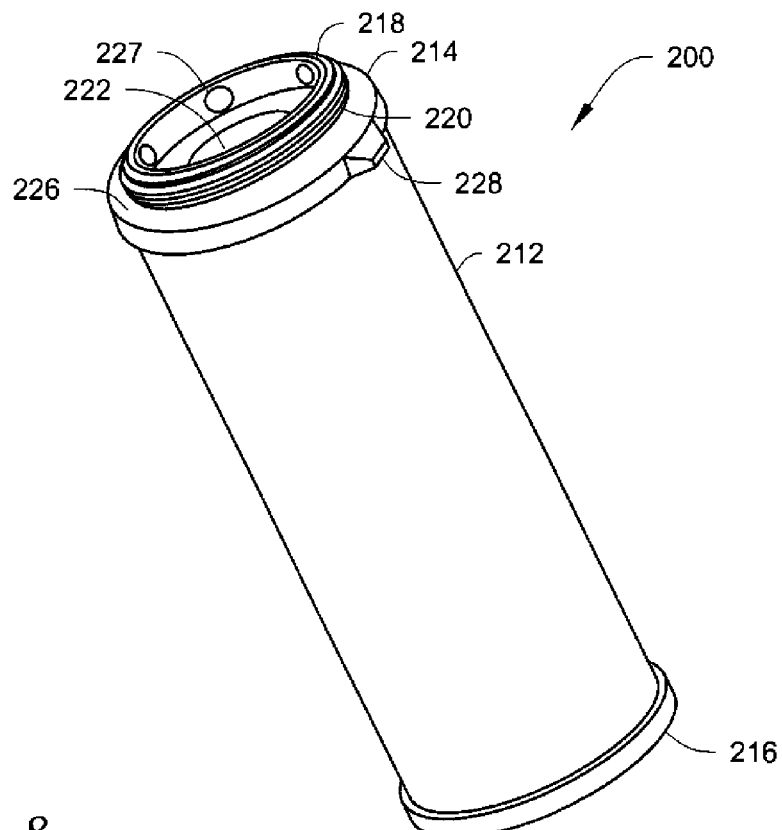
FIG. 7 is a perspective view of another embodiment of a filter.
Figure 8:
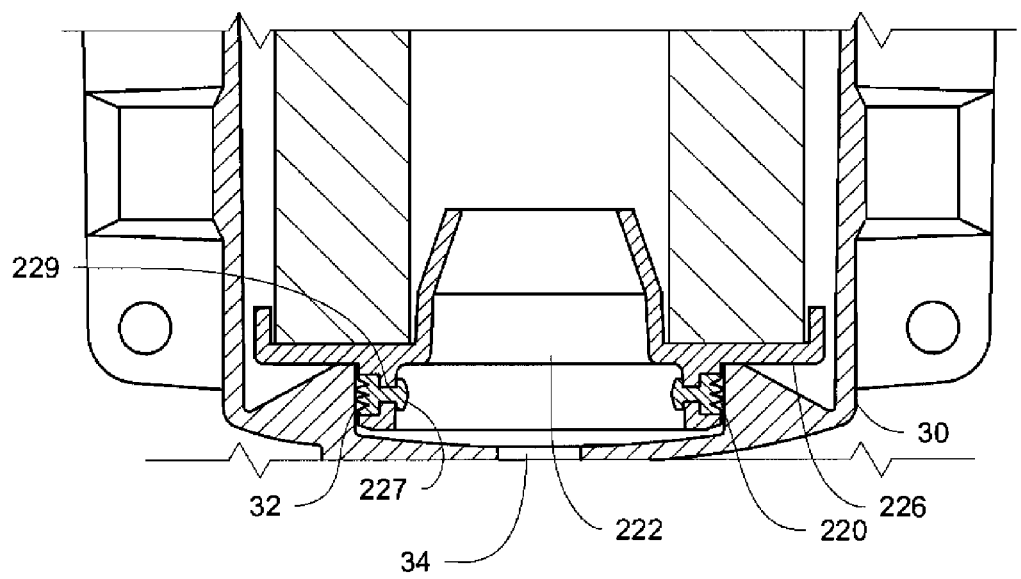

Turning to FIGS. 7 and 8, another embodiment of an oval seal 220 is illustrated for a filter 200. As with filters 10, 100, the filter 200 includes a filter media 212 attached to two endplates 214, 216. The filter media 212 is arranged and configured as a cylindrical filter element, where the endplates 214, 216 are connected at ends of the cylinder. One of the endplates (e.g. endplate 214) also includes an opening 222 that allows fluid to flow into or out of the filter media 212. The filter media 212 can be similarly constructed as already described above. The endplate 214 with the opening 222 has a main surface 226 with an elliptical spud 218 protruding outward from the main surface 226. The oval seal 220 is disposed about an outer surface of the elliptical spud 218 similarly as oval seals 20, 120. The seal 220 is a gasket that is oval shaped, since the elliptical spud 218 is oval. It will be appreciated that the material for the oval seal 220 can be the same as the material used for oval seals 20, 120 and can include the ribbed/wiper structure. As with filter 10, the endplate 214 of the filter 200 can include a similar tab structure (only one tab 228 shown), which can fit into a similar slot configuration of a housing (e.g. slots 38 of housing 30).

Differently from what is shown in FIGS. 1-6, the elliptical spud 218 includes a side opening 229 through the wall formed by the elliptical spud 218. As shown, the elliptical spud 218 includes more than one side opening 229, but it will be appreciated that the elliptical spud 218 includes at least one side opening. The oval seal 220 has an anchor portion 227 formed through each side opening 229. As shown in FIG. 8, the anchor portions 227 have a dimension residing on an inner diameter of the elliptical spud 218 that is larger than a dimension within the side opening 229. In such a configuration, the anchor portions 227 provide a locking function so that the oval seal 220 is retained around the elliptical spud 218. It will be appreciated that one or more anchor portions 227 are employed for as many side openings 229 that are available. In one embodiment, the oval seal 220 is an overmold seal such that the opening(s) 229 allow for the material forming the anchor portion(s) 227 to flow through the side opening(s) 229 into the inner diameter of the elliptical spud 218. For example, the overmold material is allowed to flow through the side opening 229, and the anchor portion 227 is formed when the material of the oval seal 220 is set.

In use, the filter 200 can be inserted into a housing (e.g. housing 30) to mate with an elliptical boss (e.g. elliptical boss 32) and where opening 222 and a housing opening (e.g. housing opening 34) are in fluid communication. It will be appreciated that the side opening and anchor portion concepts may be applied to any of the seal embodiments described and shown herein.

As described, the improved seal interface and its various configurations can help provide a keying function for a filter to ensure that the correct filter element is being used. In the example of CCV systems, maintaining a suitable seal between the "dirty" and "clean" sides of a filter are important for meeting emission regulations and providing protection to the engine. The seal configurations and their inventive concepts can also help secure aftermarket benefits, where the elliptical seal interface is uniquely dimensioned to prevent others from copying, and while maintaining a low insertion force during service and/or installation.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A filter assembly comprising:
a filter having a filter media attached to two endplates, one endplate includes an opening that allows fluid to flow into or out of the filter media, the filter media having a wall structure that allows a working fluid to be filtered through the filter media, the endplate with the opening includes a main surface with an elliptical spud protruding outward from the main surface and surrounding the opening, and an oval seal disposed about an outer surface of the elliptical spud; and
a housing releasably connected to the filter, the housing having a mounting component that includes a housing opening in fluid communication with the opening of the one endplate of the filter, and an elliptical boss surrounding the housing opening, the elliptical boss mates with the elliptical spud and seals against the oval seal.

2. The filter assembly of claim 1, wherein the oval seal includes a continuous curved shape.

3. The filter assembly of claim 2, wherein the continuous curved shape is generally an outline of a hyperbolic paraboloid.

4. The filter assembly of claim 1, wherein the oval seal further comprising at least one peak, such that a portion of the oval seal extends away from the main surface of the endplate with the opening.

5. The filter assembly of claim 1, wherein the oval seal is overmolded onto the elliptical spud.

6. The filter assembly of claim 1, further comprising at least one side opening through a wall of the elliptical spud, and the oval seal having at least one anchor portion formed through the side opening, the anchor portion retains the oval seal around the elliptical spud.

7. The filter assembly of claim 1, wherein the elliptical spud is insertable into the elliptical boss, such that the elliptical boss surrounds the elliptical spud and the oval seal.

8. The filter assembly of claim 1, wherein the elliptical boss of the housing having a shoulder abuttable with the main surface of the endplate with the opening and at an end of the filter.

9. The filter assembly of claim 1, wherein the main surface of the endplate includes at least one tab and the housing includes at least one slot, where the tab fits into the slot when the filter is connected to the housing.

10. The filter assembly of claim 1, wherein the elliptical spud protrudes from the endplate with the opening along an insertion axis, so as to extend in a direction away from the endplate with the opening and extend away from the opening, and the elliptical spud is disposed radially outside the opening of the endplate.

11. The filter assembly of claim 1, wherein the oval seal faces away from the opening of the endplate.

12. The filter assembly of claim 1, wherein the oval seal is disposed on the outer surface of the elliptical spud, and comprises at least one peak such that, relative to other portions of the oval seal, the at least one peak is proximate an end of the elliptical spud, the end being distal relative to the endplate with the opening.

13. The filter assembly of claim 1, wherein the oval seal surrounds an outer perimeter of the elliptical spud and is configured to seal outside relative to the opening.

14. A filter comprising:
a filter media having a wall structure that allows a working fluid to be filtered through the filter media;
two endplates attached to ends of the filter media respectively, one of the endplates includes an opening that allows fluid to flow into or out of the filter media, the endplate with the opening includes an elliptical spud disposed radially outside from the opening, the elliptical spud protrudes from the endplate with the opening along an insertion axis, so as to extend in a direction away from the endplate with the opening and extend away from the opening; and an oval seal disposed about an outer surface of the elliptical spud, the oval seal faces away from the opening.

15. The filter of claim 14, wherein the oval seal includes a continuous curved shape.

16. The filter of claim 14, wherein the oval seal further comprising at least one peak, such that a portion of the oval seal extends away from the main surface of the endplate with the opening.

17. The filter of claim 14, wherein the oval seal is disposed on the outer surface of the elliptical spud, and comprises at least one peak such that, relative to other portions of the oval seal, the at least one peak is proximate an end of the elliptical spud, the end being distal relative to the endplate with the opening.

18. The filter of claim 14, wherein the oval seal surrounds an outer perimeter of the elliptical spud and is configured to seal outside relative to the opening.

19. The filter of claim 14, further comprising at least one side opening through a wall of the elliptical spud, and the oval seal having at least one anchor portion formed through the side opening, the anchor portion retains the oval seal around the elliptical spud.

* * * * *